United States Patent [19]

Matsunaga et al.

[11] Patent Number: 5,993,736
[45] Date of Patent: Nov. 30, 1999

[54] LEAD-FREE TIN-SILVER-BASED SOLDERING ALLOY

[75] Inventors: Junichi Matsunaga, Gifu; Yuunosuke Nakahara; Ryuji Ninomiya, both of Saitama, all of Japan

[73] Assignee: Mitsui Mining & Smelting Co., Ltd., Tokyo, Japan

[21] Appl. No.: 09/084,552

[22] Filed: May 26, 1998

[30] Foreign Application Priority Data

Jun. 4, 1997 [JP] Japan ................................. 9-161948

[51] Int. Cl.⁶ .................................................. C22C 13/02
[52] U.S. Cl. .............................................................. 420/562
[58] Field of Search ................................... 420/557, 562, 420/560, 561

[56] References Cited

U.S. PATENT DOCUMENTS 5,762,866  1/1998  Jin et al. .................................. 420/557

FOREIGN PATENT DOCUMENTS 0499452  8/1992  European Pat. Off. .
8-19892  1/1996  Japan .
8-187590  7/1996  Japan .

OTHER PUBLICATIONS

English language abstract of Japanese Patent Document No. JP408206874A, Aug. 1996.

*Primary Examiner*—John Sheehan
*Attorney, Agent, or Firm*—Flynn, Thiel, Boutell & Tanis, P.C.

[57] ABSTRACT

The present invention provides a lead-free tin-silver-based soldering alloy which has a low melting point equal to alloy H without containing harmful lead, expensive In or the like, and has excellent mechanical characteristics, that is, a tensile strength, an elongation value and heat fatigue characteristic as compared with alloy H, and thus, is applicable to soldering work at a low temperature and can make products which have a high reliability and long useful life or durability. The lead-free tin-silver-based soldering alloy consists essentially of Ag: 2 to 4% by weight, Zn: 0.5 to 2% by weight, Bi: 2 to 6% by weight, and the balance being substantially Sn.

4 Claims, No Drawings

LEAD-FREE TIN-SILVER-BASED SOLDERING ALLOY

BACKGROUND OF THE INVENTION a) Field of the Invention

The present invention relates to a lead-free tin-silver-based soldering alloy, and more particularly, to a soldering alloy which has a low melting point equal substantially to alloy H, which is a general lead-free tin-silver-based soldering alloy, and is excellent in mechanical characteristic, that is, in a tensile strength, an elongation value and heat resistant fatigue characteristic.

b) Description of the Prior Art

Conventionally, lead has been contained in a soldering alloy. In recent years, the lead has eluted from wasted IC chips, printed circuit boards or the like and, as a result, the groundwater has been contaminated. For this reason, there has arisen an environmental problem such as lead poisoning or the like. Under such circumstances, the study and development of a lead-free soldering alloy have been made, and then, various lead-free soldering alloys have been proposed. In general, alloy H (manufactured of Nippon Alpha Metals Co., Ltd.) has been well known as a lead-free soldering alloy which is used in the aforesaid IC chips, printed circuit boards, etc. Alloy H consists essentially of Ag: 2.0% by weight, Cu: 0.5% by weight, Bi: 7.5% by weight and a balance being Sn. Further, alloy H has a melting point of 212° C., which is higher than a Pb-Sn eutectic solder, and has a melting point lower than a conventional silver-tin-based soldering alloy which does not contain Pb, Cd or the like, and has excellent melting characteristics. However, in alloy H, the elongation value is low in a tensile test and there exists a low temperature eutectic phenomenon. Further, if alloy H is kept at a high temperature, the elongation of alloy H deteriorates and, for this reason, alloy H has inferior heat fatigue characteristics. Further, alloy H cannot absorb the thermal expansion difference between the printed circuit board and components when a temperature cycle is applied to a soldering portion and, for this reason, there is the possibility that the soldering portion fractures.

Inventors of the present invention have made various studies in order to find a soldering alloy which does not contain harmful lead or the like and has an excellent melting characteristic, tensile strength and elongation value. Further, the inventors have previously proposed the invention (alloy) disclosed in Japanese Patent Application Laid-Open No. 187590 (1996) or in Japanese Patent Application Laid-Open No. 19892 (1996). However, the invention (alloy) disclosed in these Publications was inferior to alloy H in melting characteristics. Moreover, the aforesaid alloy contains very expensive In and, for this reason, it was difficult to say that the disclosed alloy is a desirable alloy.

SUMMARY OF THE INVENTION

The present invention has been made taking the aforesaid problem in the prior art into consideration. An object of the present invention is to provide a lead-free tin-silver-based soldering alloy which has a low melting point equal to alloy H without containing harmful lead, expensive In or the like, is excellent in mechanical characteristics, that is, a tensile strength, an elongation value and heat fatigue characteristic as compared with alloy H, and thus, is applicable to soldering work at a low temperature and can make products having a high reliability and long useful life.

To achieve the above object, the present invention provides a lead-free, tin-silver-based, soldering alloy consisting essentially of Ag: 2 to 4% by weight, Zn: 0.5 to 2% by weight, Bi: 2 to 6% by weight, and the balance being substantially Sn.

DETAILED DESCRIPTION OF THE PREFERRED EMBODIMENTS

The aforesaid alloy of the present invention is obtained by adding Zn and Bi to a tin-silver-based soldering alloy consisting of Sn-Ag. Ag has the effect of lowering the melting point, and further, increases the strength and brightness. In order to obtain the aforesaid effect, Ag of 2% by weight or more needs to be added. On the other hand, from the phase diagram of Sn-Ag, the following matters are evident. More specifically, the melting point of Ag becomes the lowest when Ag of 3.5% by weight is added. If Ag of 3.5% by weight or more is added, conversely, the melting point of Ag becomes high. As is evident from the above facts, even if Ag of 4% by weight or more is added, the cost merely becomes high, and there is no effect of lowering the melting point. Therefore, the upper limit of the Ag additive amount is 4% by weight. Zn has the effect of lowering the melting point and improving the mechanical strength, and it is preferable that Zn of 0.5% by weight or more is added. However, if too much Zn is added, the wettability deteriorates and, for this reason, Zn is set to 2% by weight or less. Bi of 2% by weight or more needs to be added in order to obtain a low melting point equal to alloy H. However, if too much Bi is added, the elongation is lowered and a low temperature eutectic exists therein and, for this reason, the upper limit of the Bi additive amount is 6% by weight.

By employing the composition within the range as described above, there can be provided a soldering alloy which has a low temperature melting point equal to alloy H and excellent mechanical strength, that is, a tensile strength, elongation and mechanical characteristic after being kept at a high temperature. As a result, a soldering alloy, which has excellent heat fatigue characteristics can be obtained. Therefore, it is possible to obtain a soldering alloy which can perform soldering work at a relatively low temperature, reduce the possibility of damaging a printed circuit board, make the life of IC chips long and can be stably used for a long period. The soldering alloy of the present invention is used as a foil, thin wire, cream or the like, and also is applicable to a reflow method in addition to iron soldering and immersion soldering as a soldering means. Further, it is possible to use a general rosin-based flux as a flux.

Examples will be described below.

EXAMPLE 1

Sn, Ag, Bi and Zn having a total weight of 10 kg were weighed so as to have a composition as shown in Table 1, and then, were melted in graphite crucible with an electric furnace in the air. Next, the melting temperature was set to 300° C. and each metal fully melted. Thereafter, each metal was sufficiently agitated in order to prevent gravity segregation, and then, was cast in a mold which had an internal dimension of 150×60 mm, a height of 150 mm, and a mold thickness of 10 mm. From a lower portion of the resultant casting, a JIS4 test piece was taken out by mechanical process, and then, the tensile strength and elongation value were measured according to a test method on the basis of a JIS Z2241 test. The results were shown in the following Table 1. Likewise, molten 10 kg of the metal was cooled as it is, and then, the melting point was obtained from a cooling curve. The results are shown in the following Table 1. Moreover, in order to make a comparison, the same test was made with respect to soldering alloys such as a Pb-Sn eutectic soldering alloy and alloy H so as to investigate their charactristics, and then, the results were shown in the following Table 1.

ing alloy of the present invention and alloy H as used in the above Example 2. More specifically, these alloys were kept at a high temperature (150° C.) for a predetermined time (0, 100 hours, 300 hours) and thereafter, the tensile strength and

TABLE 1

| | Chemical composition (wt %) | | | | Tensile strength | Elongation | Melting point |
|---|---|---|---|---|---|---|---|
| | Ag | Zn | Bi | Sn | (kgf/mm²) | (%) | (° C.) |
| Examples | 3 | 1.5 | 2 | Balance | 4.54 | 31.9 | 213 |
| | 3 | 1.5 | 4 | Balance | 5.46 | 24.2 | 211 |
| | 3 | 1.5 | 6 | Balance | 6.39 | 16.4 | 208 |
| | 3 | 0.5 | 4 | Balance | 5.21 | 26.3 | 214 |
| Comparative | 3 | 0 | 4 | Balance | 5.08 | 27.4 | 217 |
| examples | 3 | 3 | 4 | Balance | 5.83 | 21.2 | 210 |
| | 3 | 1.5 | 1 | Balance | 4.09 | 35.7 | 217 |
| | 3 | 1.5 | 7 | Balance | 6.86 | 12.5 | 207 |
| | Sn—2Ag—0.5Cu—7.5Bi | | | | 6.91 | 12 | 212 |
| | Sn—37Pb | | | | 3.82 | 30 | 183 |

EXAMPLE 2

Wettability was measured using a Sn-3Ag-1zn-3Bi alloy of the present invention and alloy H (Sn-2Ag-7.5Bi-0.5Cu) as a comparative example. The wettability was made under the following conditions. More specifically, zero cross time according to a meniscograph method, that is, a test piece was immersed in a solder bath, and then, values of time and wettability until a buoyant force becomes zero were measured. The results were shown in the following Table 2.

Conditions

Solder bath temperature: 260° C.

Flux: rosin-based flux

Test piece: 0.9 mm φ×60 mm Cu wire

Immersed time: 10 seconds

Immersion velocity: 2 mm/s

Immersion depth: 2 mm

Tester: solder checker SAT-2000 type (manufactured of Leska)

TABLE 2

| | Zero cross time (s) | Wettability (gf) |
|---|---|---|
| Sn—3Ag—1Zn—3Bi | 1.48 | 0.0840 |
| Sn—2Ag—7.5Bi—0.5Cu | 1.08 | 0.0940 |

EXAMPLE 3

Further, in order to investigate the influence of the content amount of Zn upon wettability, the wettability was measured by adding each of Zn: 0.5, 1, 2, 3 and 4% by weight to a Sn-3Ag-3Bi alloy. The results were shown in the following Table 3.

TABLE 3

| Containing amount of Zn (wt %) | 0.5 | 1 | 2 | 3 | 4 |
|---|---|---|---|---|---|
| Wetting tension (gf) | 0.081 | 0.084 | 0.071 | 0.051 | 0.033 |

EXAMPLE 4

In order to judge heat fatigue characteristic, a general accelerating test was made with respect to the same solder-elongation were measured. The results are shown in the following Table 4.

TABLE 4

| | Tensile strength (kgf/mm²) | | | Elongation (%) | | |
|---|---|---|---|---|---|---|
| | 0 hr | 100 hr | 300 hr | 0 hr | 100 hr | 300 hr |
| Sn—3Ag—1Zn—3Bi | 4.88 | 5.11 | 4.86 | 26.5 | 23.2 | 22.1 |
| Sn—2Ag—7.5Bi—0.5Cu | 6.91 | 5.14 | 5.21 | 12.0 | 4.21 | 4.95 |

As is seen from the Examples, the soldering alloy of the present invention has a low melting point which is almost the same as alloy H, and has an excellent tensile strength and elongation. Further, in the soldering alloy of the present invention, the zero cross time is slightly larger than alloy H, however, no problem is caused in practical use if the zero cross time ranges within 2 seconds. Therefore, the soldering alloy of the present invention is applicable to soldering work. An alloy containing Zn of 3% by weight has a wetting tension remarkably lower than an alloy containing Zn of 0.5% by weight. Further, in the soldering alloy of the present invention, both the tensile strength and elongation only slightly lower after the soldering alloy is kept at a high temperature. Thus, in the case where the soldering alloy is used in the soldering of electronic circuits or the like, the heat fatigue characteristic due to the heat from circuits is stable, and it is possible to prevent the breakdown of circuits resulting from the deterioration of tensile strength and elongation for a long period, and to improve the reliability of the soldering portion of circuits or the like.

As described above, according to the present invention, there can be obtained a soldering alloy which has a low melting point equal to conventional alloy H without containing lead, which causes environmental contamination, and has excellent mechanical characteristics, that is, tensile strength and elongation value as compared with alloy H. Further, the soldering alloy has excellent heat fatigue characteristics. Thus, even in the case where a temperature cycle is applied, it is possible to absorb a thermal expansion difference between IC substrates and components, and to restrict the risk of damaging products.

What is claimed is:

1. A lead-free tin-silver soldering alloy consisting essentially of Ag: 2 to 4% by weight, Zn: 0.5 to 2% by weight, Bi: 2 to 3% by weight, and the balance being substantially Sn.

2. The soldering alloy of claim 1, wherein 2% by weight of Bi is present.

3. The soldering alloy of claim 1, consisting essentially of 3% by weight Ag, 1% by weight Zn, 3% by weight Bi and the balance being Sn.

4. The soldering alloy of claim 2, consisting essentially of 3% by weight Ag, 1.5% by weight Zn, 2% by weight Bi and the balance being Sn.

* * * * *